July 24, 1934. D. L. GALLUP 1,967,402
BRAKE
Original Filed March 12, 1928
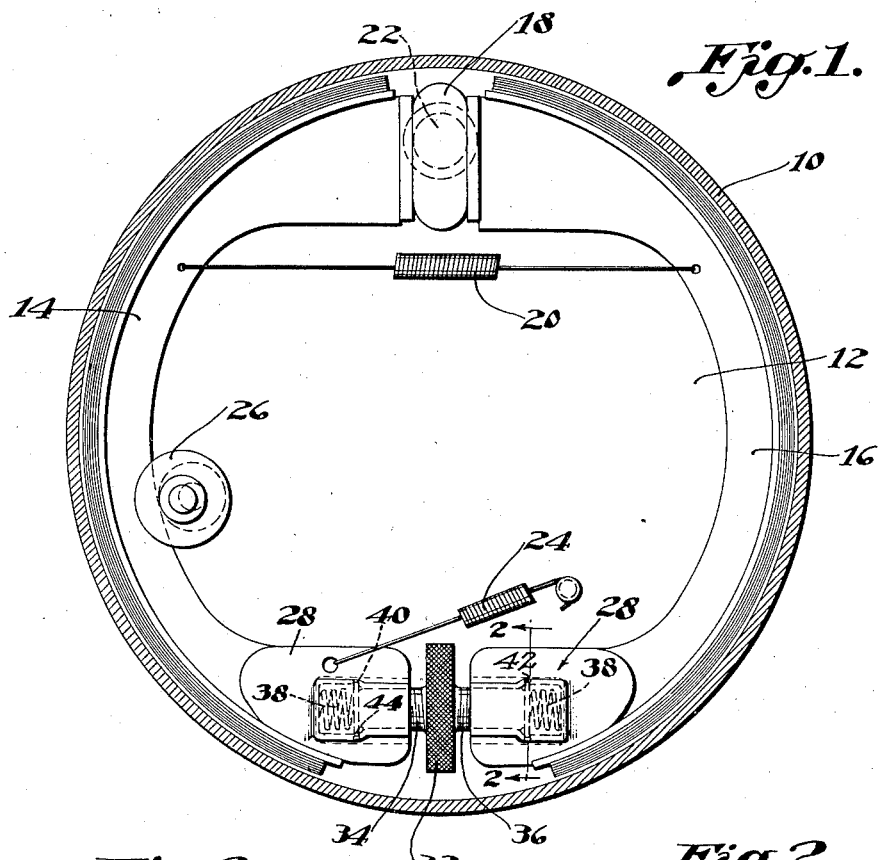
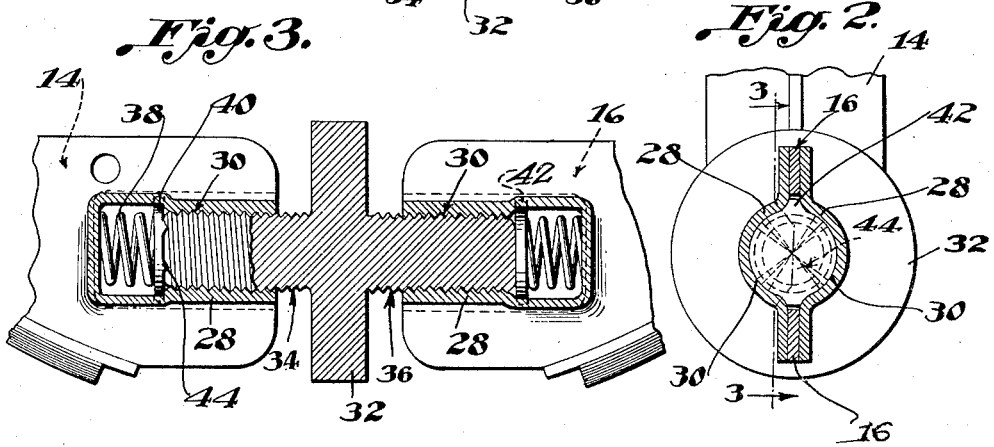
INVENTOR.
DAVID L. GALLUP
BY
ATTORNEY.

Patented July 24, 1934

1,967,402

UNITED STATES PATENT OFFICE 1,967,402

BRAKE

David L. Gallup, South Bend, Ind., assignor to Bendix Brake Company, South Bend, Ind., a corporation of Illinois Original application March 12, 1928, Serial No. 260,858. Divided and this application April 27, 1931, Serial No. 533,247

8 Claims. (Cl. 188—79.5)

This invention relates to adjusting means for the friction elements of a brake.

The present invention is a division of my pending application, Serial No. 260,858, filed March 12, 1928 and is made in accordance with requirements of the United States Patent Office under provision of Rule 42.

In the illustrated embodiment the adjusting means is shown connecting two semi-flexible friction elements for an internal expanding brake.

As shown, the device comprises a disk having co-axial shanks which may be threaded into adjacent ends of flexible friction elements or may require an adjustable connection.

The invention comprehends a brake including corresponding semi-flexible friction elements or shoes arranged end to end with adjacent ends of the shoes rigidly connected by an adjusting member and a cam or the like between the other ends of the shoes preferably arranged to take the braking torque.

An object of the invention is to provide a rigid adjustable connection for the friction elements of a brake.

Another object of the invention is to provide an exceedingly cheap and simple adjusting device which may be economically produced.

Other objects and features of the invention, including various combinations of parts and desirable structure will be apparent from the following description taken in connection with the drawing forming a part of this specification and, in which:

Figure 1 is a vertical section through the brake, just inside the head of the brake drum, showing the brake shoes in side elevation and illustrating the invention as applied;

Figure 2 is a section through the connecting device and one of the friction elements, substantially on line 2—2 of Figure 1, and Fig. 3 is a vertical section on line 3—3 of Fig. 2, shown on a large scale, through the connecting device between the friction elements of the brake.

The illustrated brake includes a rotatable drum 10, at the open end of which is a support such as a backing plate 12, and within which is a friction means adaptable for cooperation with the drum. As shown, the friction means comprise interchangeable shoes 14 and 16. The shoes are T-shaped in cross-section and have sufficient flexibility to be expanded into contact with the drum.

The friction elements or shoes are applied by means such as an asymmetric double cam 18, against the resistance of a return spring 20. The cam 18 may be integral with a camshaft 22 journaled in a bracket suitably secured to the backing plate between the separable ends of the shoes. Preferably the cam also serves as an anchor to take the torque from one or the other of friction elements on shoes 14 and 16. In the arrangement shown, in forward braking, the cam turns clockwise while the drum turns counterclockwise.

An auxiliary return spring 24 is connected between the shoes 14 and the backing plate. This spring together with an adjustable eccentric stop 26 on the backing plate near the center of the shoes 14, cooperate with cam 18 and spring 20 in determining the idle position of the friction means.

The shoes are formed with coaxial threaded sockets. These sockets are preferably formed by cutting a slot lengthwise into the stiffening web of each shoe, and welding or otherwise securing to opposite sides of the web two pressed-steel plates 28 formed with semi-cylindrical portions 30. The socket so formed may be threaded in any usual manner.

The shoes are shown adjustably connected by a disk 32 having co-axial threaded stems 34 and 36 extending in opposite directions and threaded into the sockets in the shoe ends. As shown, the edge of the disk is milled or serrated, so that the device may be easily manipulated, as shown in Figure 2.

At the closed end of one or both of the above-described sockets, there may be confined a coil spring 38 compressed between the end of the socket and a pawl washer 40. The washer 40 is shown with lugs 42 projecting into the slot in the shoe web between the plates 28, which forms in effect upper and lower keyways in which the lugs 42 slide freely, permitting axial movement of the washer but preventing it from turning. This washer also has one or more teeth 44 interlocking with teeth cut in the ends of stems 34 and 36 to hold the adjusting device yieldingly against unintended turning or other locking means may be employed.

While one illustrative embodiment has been described in detail, it is not my intention to limit its scope to that particular embodiment, or otherwise than by the appended claims.

Having thus described the various features of the invention, what I claim as new and desire to secure by Letters Patent is:

1. A brake comprising a plurality of floating shoes and means rigidly and adjustably connecting the shoes.

2. A brake comprising a pair of semi-flexible floating shoes and a member rigidly and adjustably connecting the shoes.

3. A brake comprising a pair of semi-flexible floating shoes and means rigidly connecting the shoes including opposed screws.

4. A brake comprising a pair of semi-flexible floating shoes, opposed screws rigidly connecting the shoes and means yieldingly locking the screws.

5. A brake comprising a drum, friction means within the drum including a pair of floating shoes, at least some portions of the friction means being flexible, a rigid connecting device threaded into adjacent ends of the shoes and an operating cam between the other ends of the shoes arranged to take the torque of the brake.

6. A brake comprising a drum, friction means within the drum including a pair of floating shoes, at least some portions of the floating shoes being flexible, a rigid connecting device threaded into adjacent ends of the shoes and operating means between the other ends of the shoes arranged to take the torque of the brake.

7. A brake comprising a fixed support, a rotatable drum associated therewith, a pair of semi-flexible floating shoes on the support arranged for cooperation with the drum, a rigid connecting means threaded into adjacent ends of the shoes and operating means between the other ends of the shoes to take the torque of the brake.

8. A brake comprising a fixed support, a rotatable drum associated therewith, a pair of semi-flexible shoes arranged end to end on the support for cooperation with the drum, a member having opposed screws threaded into adjacent ends of the shoes means yieldingly locking the screws and operating means between the other ends of the shoes arranged to take the torque of the brake.

DAVID L. GALLUP.